United States Patent
Parmar et al.

(10) Patent No.: US 12,159,413 B2
(45) Date of Patent: Dec. 3, 2024

(54) IMAGE INVERSION USING MULTIPLE LATENT SPACES

(71) Applicant: Adobe Inc., San Jose, CA (US)

(72) Inventors: Gaurav Parmar, Pittsburgh, PA (US); Krishna Kumar Singh, San Jose, CA (US); Yijun Li, Seattle, WA (US); Richard Zhang, San Francisco, CA (US); Jingwan Lu, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 473 days.

(21) Appl. No.: 17/693,618

(22) Filed: Mar. 14, 2022

(65) Prior Publication Data
US 2023/0289970 A1  Sep. 14, 2023

(51) Int. Cl.
  *G06T 7/11*   (2017.01)
  *G06T 3/4046* (2024.01)
  *G06T 11/00*  (2006.01)

(52) U.S. Cl.
  CPC .............. *G06T 7/11* (2017.01); *G06T 3/4046* (2013.01); *G06T 11/001* (2013.01); *G06T 2207/20081* (2013.01); *G06T 2207/20084* (2013.01)

(58) Field of Classification Search
  CPC ....... G06T 7/11; G06T 3/4046; G06T 11/001; G06T 2207/20081; G06T 2207/20084; G06T 11/60
  USPC ....................................................... 382/157
  See application file for complete search history.

(56) References Cited

U.S. PATENT DOCUMENTS

| | | | |
|---|---|---|---|
| 2021/0264236 A1* | 8/2021 | Xu | G06V 10/774 |
| 2022/0121932 A1* | 4/2022 | Kalarot | G06V 10/82 |
| 2022/0277431 A1* | 9/2022 | Tensmeyer | G06N 3/088 |
| 2022/0284646 A1* | 9/2022 | Saha | G06T 7/10 |
| 2023/0124252 A1* | 4/2023 | Liu | G06T 11/00 345/589 |

(Continued)

OTHER PUBLICATIONS

C. J. Shin and Y. S. Heo, "GAN Inversion with Semantic Segmentation Map for Image Editing," 2022 13th International Conference on Information and Communication Technology Convergence (ICTC), Jeju Island, Korea, Republic of, 2022, pp. 927-931, (Year: 2022).*

(Continued)

*Primary Examiner* — Kathleen Y Dulaney
(74) *Attorney, Agent, or Firm* — FIG. 1 Patents

(57) ABSTRACT

In implementations of systems for image inversion using multiple latent spaces, a computing device implements an inversion system to generate a segment map that segments an input digital image into a first image region and a second image region and assigns the first image region to a first latent space and the second image region to a second latent space that corresponds to a layer of a convolutional neural network. An inverted latent representation of the input digital image is computed using a binary mask for the second image region. The inversion system modifies the inverted latent representation of the input digital image using an edit direction vector that corresponds to a visual feature. An output digital image is generated that depicts a reconstruction of the input digital image having the visual feature based on the modified inverted latent representation of the input digital image.

20 Claims, 11 Drawing Sheets

(56) References Cited

U.S. PATENT DOCUMENTS

| | | | | |
|---|---|---|---|---|
| 2023/0146676 A1* | 5/2023 | Liu | ................... | G06T 11/60 |
| | | | | 382/157 |
| 2023/0162320 A1* | 5/2023 | Song | ................... | G06T 5/50 |
| | | | | 382/100 |
| 2023/0214973 A1* | 7/2023 | Kwong | ............. | G06N 3/088 |
| | | | | 345/581 |

OTHER PUBLICATIONS

Abdal, Rameen et al., "Image2StyleGAN: How to Embed Images Into the StyleGAN Latent Space?", 2019 IEEE/CVF International Conference on Computer Vision (ICCV) [retrieved Jan. 21, 2022]. Retrieved from the Internet <https://arxiv.org/pdf/1904.03189.pdf>., Sep. 3, 2019, 23 pages.

Abdal, Rameen et al., "Image2StyleGAN++: How to Edit the Embedded Images?", Cornell University arXiv, arXiv.org [retrieved Jan. 21, 2022]. Retrieved from the Internet <https://arxiv.org/pdf/1911.11544.pdf>., Nov. 2019, 18 Pages.

Abdal, Rameen et al., "Styleflow: Attribute-conditioned exploration of stylegan-generated images using conditional continuous normalizing flows", ACM Transactions on Graphics, vol. 40, No. 3 [retrieved Jan. 21, 2022]. Retrieved from the Internet <https://arxiv.org/pdf/2008.02401.pdf>., May 5, 2021, 22 Pages.

Alaluf, Yuval et al., "Only a Matter of Style: Age Transformation Using a Style-Based Regression Model", Cornell University arXiv, arXiv.org [retrieved Jan. 21, 2022]. Retrieved from the Internet <https://arxiv.org/pdf/2102.02754.pdf>., May 18, 2021, 21 Pages.

Alaluf, Yuval et al., "ReStyle: A Residual-Based StyleGAN Encoder via Iterative Refinement", Cornell University arXiv, arXiv.org [retrieved Jan. 21, 2022]. Retrieved from the Internet <https://arxiv.org/pdf/2104.02699.pdf>., Apr. 2021, 35 Pages.

Anirudh, Rushil et al., "MimicGAN: Robust Projection onto Image Manifolds with Corruption Mimicking", Cornell University arXiv, arXiv.org [retrieved Jan. 24, 2022]. Retrieved from the Internet <https://arxiv.org/pdf/1912.07748.pdf>., Apr. 30, 2020, 20 Pages.

Asim, Muhammad et al., "Blind Image Deconvolution using Deep Generative Priors", Cornell University arXiv, arXiv.org [retrieved Jan. 24, 2022]. Retrieved from the Internet <http://arxiv-export-lb.library.cornell.edu/pdf/1802.04073>., Feb. 26, 2019, 20 pages.

Bau, David et al., "GAN Dissection: Visualizing and Understanding Generative Adversarial Networks", Cornell University arXiv, arXiv.org [retrieved Jan. 24, 2022]. Retrieved from the Internet <https://arxiv.org/pdf/1811.10597.pdf>., Dec. 8, 2018, 18 pages.

Bau, David et al., "Seeing What a GAN Cannot Generate", 2019 IEEE/CVF International Conference on Computer Vision (ICCV) [retrieved Jan. 24, 2022]. Retrieved from the Internet <http://bzhou.ie.cuhk.edu.hk/publication/iccv19_see_gan.pdf>., Oct. 24, 2019, 10 pages.

Bau, David et al., "Semantic Photo Manipulation with a Generative Image Prior", Cornell University arXiv, arXiv.org [retrieved Jan. 31, 2022]. Retrieved from the Internet <https://arxiv.org/pdf/2005.07727.pdf>., Sep. 12, 2020, 11 pages.

Bińkowski, Mikołaj et al., "Demystifying MMD GANs", Cornell University arXiv, arXiv.org [retrieved Jan. 24, 2022]. Retrieved from the Internet <https://arxiv.org/pdf/1801.01401.pdf>., Jan. 14, 2021, 36 Pages.

Brock, Andrew et al., "Large Scale Gan Training for High Fidelity Natural Image Synthesis", Cornell University arXiv, arXiv.org [retrieved Jan. 24, 2022]. Retrieved from the Internet <https://arxiv.org/pdf/1809.11096.pdf>., Feb. 25, 2019, 35 pages.

Brock, Andrew et al., "Neural Photo Editing with Introspective Adversarial Networks", Cornell University arXiv, arXiv.org [retrieved Jan. 21, 2022]. Retrieved from the Internet <https://arxiv.org/pdf/1609.07093.pdf>., Feb. 6, 2017, 15 pages.

Chai, Lucy et al., "Ensembling With Deep Generative Views", Cornell University arXiv, arXiv.org [retrieved Jan. 24, 2022]. Retrieved from the Internet <https://arxiv.org/pdf/2104.14551.pdf>., Apr. 29, 2021, 24 Pages.

Chai, Lucy et al., "Using latent space regression to analyze and leverage compositionality in GANs", Cornell University arXiv, arXiv.org [retrieved Jan. 24, 2022]. Retrieved from the Internet <https://arxiv.org/pdf/2103.10426.pdf>., Jun. 3, 2021, 30 Pages.

Collins, Edo et al., "Editing in Style: Uncovering the Local Semantics of GANs", Cornell University arXiv, arXiv.org [retrieved Jan. 24, 2022]. Retrieved from the Internet <https://arxiv.org/pdf/2004.14367.pdf>., May 21, 2020, 23 Pages.

Goodfellow, Ian J. et al., "Generative Adversarial Nets", In: Advances in neural information processing systems (2014) [retrieved Feb. 17, 2022]. Retrieved from the Internet <https://www.cs.utah.edu/~zhe/teach/archived/2019f/6190-pdf/gans.pdf>., Jun. 10, 2014, 9 pages.

Gu, Jinjin et al., "Image Processing Using Multi-Code GAN Prior", Cornell University arXiv, arXiv.org [retrieved Jan. 24, 2022]. Retrieved from the Internet <https://arxiv.org/pdf/1912.07116.pdf>., Mar. 31, 2020, 10 Pages.

Härkönen, Erik et al., "GANSpace: Discovering Interpretable GAN Controls", Cornell University arXiv, arXiv.org [retrieved Jan. 27, 2022]. Retrieved from the Internet <https://arxiv.org/pdf/2004.02546.pdf>., Dec. 14, 2020, 29 Pages.

Heusel, Martin et al., "GANs Trained by a Two Time-Scale Update Rule Converge to a Local Nash Equilibrium", NIPS'17: Proceedings of the 31st International Conference on Neural Information Processing Systems [retrieved Feb. 17, 2022]. Retrieved from the Internet <https://proceedings.neurips.cc/paper/2017/file/8a1d694707eb0fefe65871369074926d-Paper.pdf>., Jan. 12, 2018, 12 pages.

Huang, Xun et al., "Arbitrary Style Transfer in Real-time with Adaptive Instance Normalization", Cornell University arXiv, arXiv.org [retrieved Jan. 24, 2022]. Retrieved from the Internet <https://arxiv.org/pdf/1703.06868.pdf>., Jul. 30, 2017, 11 pages.

Huh, Minyoung et al., "Transforming and projecting images into class-conditional generative net", Cornell University arXiv, arXiv.org [retrieved Jan. 24, 2022]. Retrieved from the Internet <https://arxiv.org/pdf/2005.01703.pdf>., Aug. 27, 2020, 27 Pages.

Jahanian, Ali et al., "On the "steerability" of generative adversarial networks", Cornell University arXiv, arXiv.org [retrieved Jan. 27, 2022]. Retrieved from the Internet <https://arxiv.org/pdf/1907.07171.pdf>., Feb. 17, 2020, 31 Pages.

Kafri, Omer et al., "StyleFusion: a Generative Model for Disentangling Spatial Segments", Cornell University arXiv, arXiv.org [retrieved Jan. 24, 2022]. Retrieved from the Internet <https://arxiv.org/pdf/2107.07437.pdf>., Jul. 15, 2021, 31 Pages.

Kang, Kyoungkook et al., "GAN Inversion for Out-of-Range Images With Geometric Transformations", Cornell University arXiv, arXiv.org [retrieved Jan. 24, 2022]. Retrieved from the Internet <https://arxiv.org/pdf/2108.08998.pdf>., Aug. 20, 2021, 9 Pages.

Karnewar, Animesh et al., "MSG-GAN: Multi-Scale Gradients for Generative Adversarial Networks" Cornell University arXiv, arXiv.org [retrieved Jan. 24, 2022]. Retrieved from the Internet <https://arxiv.org/pdf/1903.06048.pdf>., Jun. 12, 2020, 18 Pages.

Karras, Tero et al., "A Style-Based Generator Architecture for Generative Adversarial Networks", Cornell University arXiv, arXiv.org [retrieved Feb. 17, 2022]. Retrieved from the Internet <https://arxiv.org/pdf/1812.04948.pdf>., Mar. 29, 2019, 12 pages.

Karras, Tero et al., "Alias-Free Generative Adversarial Networks", Cornell University arXiv, arXiv.org [retrieved Jan. 25, 2022]. Retrieved from the internet <https://arxiv.org/pdf/2106.12423.pdf>., Oct. 18, 2021, 31 Pages.

Karras, Tero et al., "Analyzing and Improving the Image Quality of StyleGAN", Cornell University arXiv, arXiv.org [retrieved Feb. 17, 2022]. retrieved from the Internet <https://arxiv.org/pdf/1912.04958.pdf>., Dec. 2019, 21 Pages.

Karras, Tero et al., "Progressive Growing of GANs for Improved Quality, Stability, and Variation", Cornell University arXiv, arXiv.org [retrived Jan. 24, 2022]. Retrieved from the Internet <https://arxiv.org/pdf/1710.10196.pdf>., Feb. 26, 2018, 26 Pages.

Karras, Tero et al., "Training Generative Adversarial Networks with Limited Data", Cornell University arXiv, arXiv.org [retrieved Jan. 24, 2022]. Retrieved from the Internet <https://arxiv.org/pdf/2006.06676.pdf>., Oct. 7, 2020, 37 Pages.

Kim, Hyunsu et al., "Exploiting Spatial Dimensions of Latent in GAN for Real-Time Image Editing", Cornell University arXiv,

(56) References Cited

OTHER PUBLICATIONS arXiv.org [retrieved Jan. 25, 2022]. Retrieved from the Internet <https://arxiv.org/pdf/2104.14754.pdf>., Jun. 23, 2021, 25 Pages.

Kirillov, Alexander et al., "Panoptic feature pyramid networks", Cornell University arXiv, arXiv.org [retrieved Jan. 25, 2022]. Retrieved from the Internet <https://arxiv.org/pdf/1901.02446.pdf>., Apr. 10, 2019, 10 Pages.

Larsen, Anders B. et al., "Autoencoding beyond pixels using a learned similarity metric", Cornell University arXiv, arXiv.org [retrieved Jan. 25, 2022]. Retrieved from the Internet <https://arxiv.org/pdf/1512.09300.pdf>., Feb. 10, 2016, 8 pages.

Lee, Cheng-Han et al., "MaskGAN: Towards Diverse and Interactive Facial Image Manipulation", Cornell University arXiv, arXiv.org [retrieved Feb. 3, 2022]. Retrieved from the Internet <https://arxiv.org/pdf/1907.11922.pdf>., Apr. 1, 2020, 20 Pages.

Lin, Tsung-Yi et al., "Microsoft COCO: Common Objects in Context", Cornell University arXiv, arXiv.org [retrieved Feb. 14, 2022]. Retrieved from the Internet <https://arxiv.org/pdf/1405.0312.pdf>., Feb. 21, 2015, 15 Pages.

Lipton, Zachary C. et al., "Precise Recovery of Latent Vectors from Generative Adversarial Networks", Cornell University arXiv, arXiv.org [retrieved Jan. 25, 2022]. Retrieved from the Internet <https://arxiv.org/pdf/1702.04782.pdf>., Feb. 17, 2017, 4 pages.

Luo, Xuan et al., "Time-travel rephotography", ACM Transactions on Graphics, vol. 40, No. 6 [retrieved Jan. 25, 2022]. Retrieved from the Internet <https://arxiv.org/pdf/2012.12261.pdf>., Dec. 10, 2021, 12 Pages.

Pan, Xingang et al., "Exploiting Deep Generative Prior for Versatile Image Restoration and Manipulation", Cornell University arXiv, arXiv.org [retrieved Jan. 25, 2022]. Retrieved from the Internet <https://arxiv.org/pdf/2003.13659.pdf>., Jul. 20, 2020, 16 Pages.

Park, Taesung et al., "Swapping Autoencoder for Deep Image Manipulation", Cornell University arXiv, arXiv.org [retrieved Jan. 25, 2022]. Retrieved from the Internet <https://arxiv.org/pdf/2007.00653.pdf>., Dec. 14, 2020, 23 Pages.

Patashnik, Or et al., "StyleCLIP: Text-Driven Manipulation of StyleGAN Imagery", Cornell University arXiv, arXiv.org [retrieved Feb. 3, 2022]. Retrieved from the Internet <https://arxiv.org/pdf/2103.17249.pdf>., Mar. 31, 2021, 18 Pages.

Peebles, William et al., "The Hessian Penalty: a Weak Prior for Unsupervised Disentanglement", Cornell University arXiv, arXiv.org [retrieved Jan. 25, 2022]. Retrieved from the Internet <https://arxiv.org/pdf/2008.10599.pdf>., Aug. 24, 2020, 23 Pages.

Perarnau, Guim et al., "Invertible Conditional GANs for image editing", Cornell University arXiv, arXiv.org [retrieved Jan. 25, 2022]. Retrieved from the Internet <https://arxiv.org/pdf/1611.06355.pdf>., Nov. 19, 2016, 9 pages.

Richardson, Elad et al., "Encoding in Style: a StyleGAN Encoder for Image-to-Image Translation", Cornell University arXiv, arXiv.org [retrieved Feb. 17, 2022]. Retrieved from the Internet <https://arxiv.org/pdf/2008.00951.pdf>., Aug. 2020, 21 Pages.

Roich, Daniel et al., "Pivotal Tuning for Latent-based Editing of Real Images", Cornell University arXiv, arXiv.org [retrieved Jan. 25, 2022]. Retrieved from the Internet <https://arxiv.org/pdf/2106.05744.pdf>., Jun. 10, 2021, 26 Pages.

Salimans, Tim et al., "Improved Techniques for Training GANs", NIPS'16: Proceedings of the 30th International Conference on Neural Information Processing Systems [retrieved Jan. 25, 2022]. Retrieved from the Internet <https://proceedings.neurips.cc/paper/2016/file/8a3363abe792db2d8761d6403605aeb7-Paper.pdf>., Dec. 5, 2016, 10 pages.

Shen, Yujun, "Closed-Form Factorization of Latent Semantics in GANs", Cornell University arXiv, arXiv.org [retrieved Jan. 27, 2022]. Retrieved from the Internet <https://arxiv.org/pdf/2007.06600.pdf>., Apr. 3, 2021, 9 Pages.

Shen, Yujun et al., "InterFaceGAN: Interpreting the Disentangled Face Representation Learned by GANs", Cornell University arXiv, arXiv.org [retrieved Jan. 26, 2022]. Retrieved from the Internet <https://arxiv.org/pdf/2005.09635.pdf>., Oct. 29, 2020, 16 Pages.

Sun, Ke et al., "High-Resolution Representations for Labeling Pixels and Regions", Cornell University arXiv, arXiv.org [retrieved Jan. 25, 2022]. Retrieved from the Internet <https://arxiv.org/pdf/1904.04514.pdf>., Apr. 9, 2019, 13 Pages.

Suzuki, Ryohei et al., "Spatially Controllable Image Synthesis with Internal Representation Collaging", Cornell University arXiv, arXiv.org [retrieved Jan. 25, 2022]. Retrieved from the Internet <https://arxiv.org/pdf/1811.10153.pdf>., Apr. 9, 2019, 14 pages.

Tewari, Ayush et al., "StyleRig: Rigging StyleGAN for 3D Control Over Portrait Images", Cornell University arXiv, arXiv.org [retrieved Jan. 25, 2022]. Retrieved from the Internet <https://arxiv.org/pdf/2004.00121.pdf>., Jun. 13, 2020, 13 Pages.

Tov, Omer et al., "Designing an encoder for StyleGAN image manipulation", ACM Transactions on Graphics, vol. 40, No. 4 [retrieved Jan. 21, 2022]. Retrieved from the Internet <https://arxiv.org/pdf/2102.02766.pdf>., Jul. 19, 2021, 33 Pages.

Voynov, Andrey et al., "Unsupervised Discovery of Interpretable Directions in the GAN Latent Space", Cornell University arXiv, arXiv.org [retrieved Jan. 27, 2022]. Retrieved from the Internet <https://arxiv.org/pdf/2002.03754.pdf>., Jun. 24, 2020, 15 Pages.

Wang, Sheng-Yu et al., "CNN-Generated Images Are Surprisingly Easy to Spot . . . for Now", Cornell University arXiv, arXiv.org [retrieved Feb. 3, 2022]. Retrieved from the Internet <https://arxiv.org/pdf/1912.11035.pdf>., Apr. 4, 2020, 13 Pages.

Wu, Yanze et al., "Towards Vivid and Diverse Image Colorization With Generative Color Prior", Cornell University arXiv, arXiv.org [retrieved Jan. 25, 2022]. Retrieved from the Internet <https://arxiv.org/pdf/2108.08826.pdf>., Aug. 19, 2021, 20 Pages.

Wu, Zongze et al., "StyleSpace Analysis: Disentangled Controls for StyleGAN Image Generation", Cornell University arXiv, arXiv.org [retrieved Jan. 25, 2022]. Retrieved from the Internet <https://arxiv.org/pdf/2011.12799.pdf>., Dec. 3, 2020, 25 Pages.

Wulff, Jonas et al., "Improving Inversion and Generation Diversity in StyleGAN using a Gaussianized Latent Space", Cornell University arXiv, arXiv.org [retrieved Jan. 25, 2022]. Retrieved from the Internet <https://arxiv.org/pdf/2009.06529.pdf>., Sep. 14, 2020, 16 Pages.

Xia, Weihao et al., "GAN Inversion: A Survey", Cornell University arXiv, arXiv.org [retrieved Jan. 21, 2022]. Retrieved from the Internet <https://arxiv.org/pdf/2101.05278.pdf>., Aug. 13, 2021, 21 Pages.

Yeh, Raymond A. et al., "Semantic Image Inpainting with Deep Generative Models", Cornell University arXiv, arXiv.org [retrieved Jan. 25, 2022]. Retrieved from the Internet <https://arxiv.org/pdf/1607.07539.pdf>., Jul. 13, 2017, 19 pages.

Yu, Changqian et al., "BiSeNet V2: Bilateral Network with Guided Aggregation for Real-Time Semantic Segmentation", Cornell University arXiv, arXiv.org [retrieved Jan. 25, 2022]. Retrieved from the Internet <https://arxiv.org/pdf/2004.02147.pdf>., Apr. 5, 2020, 16 Pages.

Zhang, Richard et al., "The Unreasonable Effectiveness of Deep Features as a Perceptual Metric", Cornell University arXiv, arXiv.org [retrieved Feb. 17, 2022]. Retrieved from the Internet <https://arxiv.org/pdf/1801.03924.pdf>., Apr. 10, 2018, 14 Pages.

Zhao, Shengyu et al., "Differentiable Augmentation for Data-Efficient GAN Training", Cornell University arXiv, arXiv.org [retrieved Jan. 25, 2022]. Retrieved from the Internet <https://arxiv.org/pdf/2006.10738.pdf>., Dec. 7, 2020, 23 Pages.

Zhou, Bolei et al., "Semantic Understanding of Scenes Through the ADE20K Dataset", International Journal of Computer Vision, Vo. 127, No. 3 [retrieved Jan. 25, 2022]. Retrieved from the Internet <https://arxiv.org/pdf/1608.05442.pdf>., Mar. 1, 2019, 19 Pages.

Zhu, Jiapeng et al., "In-Domain GAN Inversion for Real Image Editing", European Conference on Computer Vision [retrieved Jan. 25, 2022]. Retrieved from the Internet <https://www.ecva.net/papers/eccv_2020/papers_ECCV/papers/123620579-supp.pdf>., Nov. 2020, 15 Pages.

Zhu, Jun-Yan et al., "Generative Visual Manipulation on the Natural Image Manifold", University of California, Berkeley, 2018, [retrieved on Jan. 21, 2022], Retrieved from the Internet: <URL:https://arxiv.org/pdf/1609.03552.pdf>., Dec. 16, 2018, 16 pages.

Zhu, Peihao et al., "Barbershop: Gan-based image compositing using segmentation masks", Cornell University arXiv, arXiv.org

(56) References Cited

OTHER PUBLICATIONS

[retrieved Jan. 25, 2022]. Retrieved from the Internet <https://arxiv.org/pdf/2106.01505.pdf>., Oct. 16, 2021, 17 Pages.

Zhu, Peihao et al., "Improved StyleGAN Embedding: Where are the Good Latents?", Cornell University arXiv, arXiv.org [retrieved Jan. 25, 2022]. Retrieved from the Internet <https://arxiv.org/pdf/2012.09036.pdf>., Oct. 15, 2021, 16 Pages.

* cited by examiner

IMAGE INVERSION USING MULTIPLE LATENT SPACES

BACKGROUND

Generative adversarial network (GAN) inversion is a technique for editing a digital image in which the digital image is projected or "inverted" into a latent space of a pretrained GAN. After the digital image is inverted into the latent space, a latent representation of the digital image or an inverted latent code is edited, for example, using an edit direction vector that corresponds to a visual feature. The edited inverted latent code is then used by a generator to generate an output digital image which depicts a reconstruction of the digital image having the visual feature.

Different latent spaces have different inversion capabilities. For example, latent spaces corresponding to earlier layers of the generator (layers that are farthest from an output pixel space) allow flexible local and global editing of an image. However, inverted latent code edited in the earlier layers of the generator is not usable to accurately reconstruct the image. Latent spaces corresponding to later layers of the generator (layers that are closest to an output pixel space) allow for accurate reconstruction of the image; however, inversion in the later layers limits editability of the image as certain image attributes are controlled by the earlier layers of the generator.

Because of this tradeoff between editability and reconstruction, conventional systems for GAN inversion are limited to editing images that depict relatively simple objects such as faces that are relatively easy to reconstruct. Conventional systems are not capable of accurately editing images that depict scenes that have a more diverse visual appearance and are more frequently occluded than faces. The inability of conventional systems to accurately edit images depicting complex or unique scenes is a shortcoming of these systems.

SUMMARY

Techniques and systems for image inversion using multiple latent spaces are described. In an example, a computing device implements an inversion system to generate a segment map that segments an input digital image into a first image region and a second image region and assigns the first image region to a first latent space and the second image region to a second latent space that corresponds to a layer of a convolutional neural network. For instance, an inverted latent representation of the input digital image is computed using a binary mask for the second image region.

The inversion system modifies the inverted latent representation of the input digital image using an edit direction vector that corresponds to a visual feature. For example, the visual feature is a color feature, a pose feature, a size feature, etc. An output digital image is generated by the convolutional neural network that depicts a reconstruction of the input digital image having the visual feature based on the modified inverted latent representation of the input digital image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
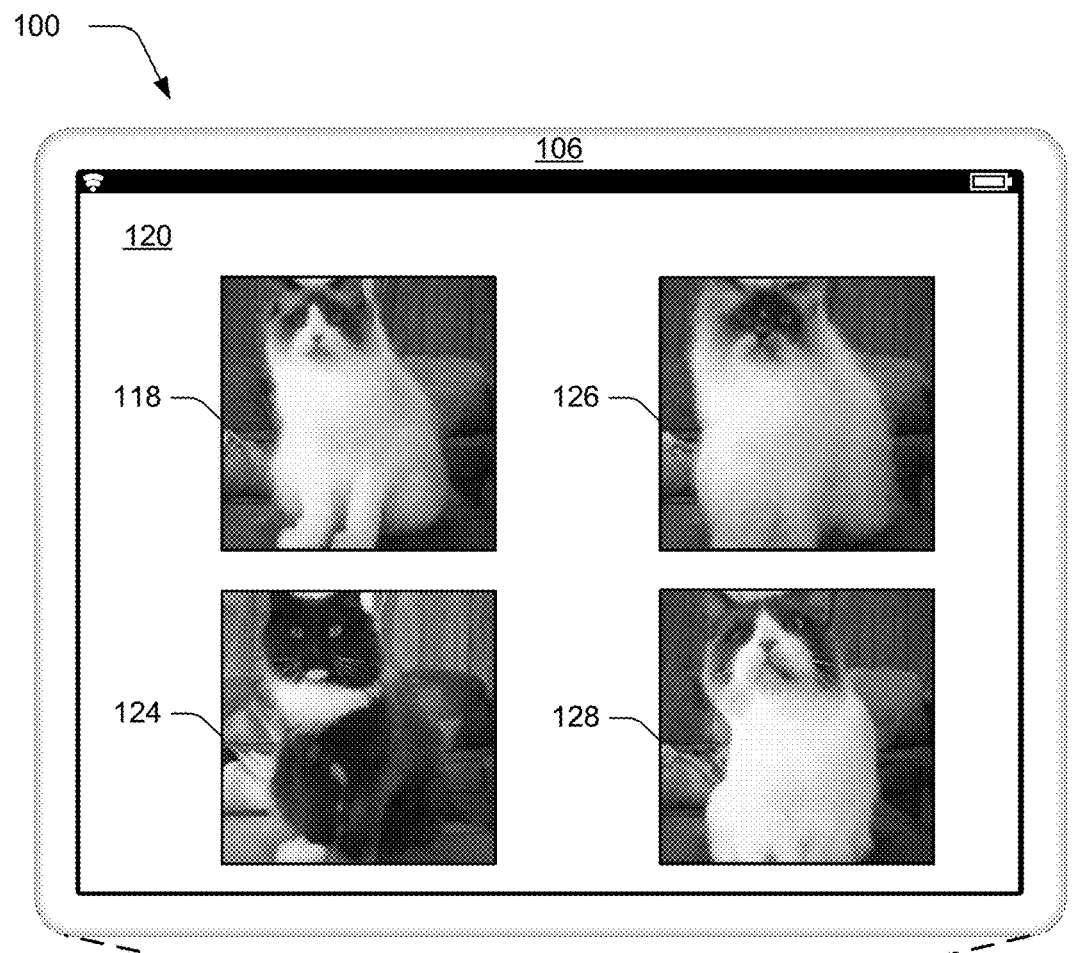
FIG. 1 is an illustration of an environment in an example implementation that is operable to employ digital systems and techniques for image inversion using multiple latent spaces as described herein.
Figure 1:
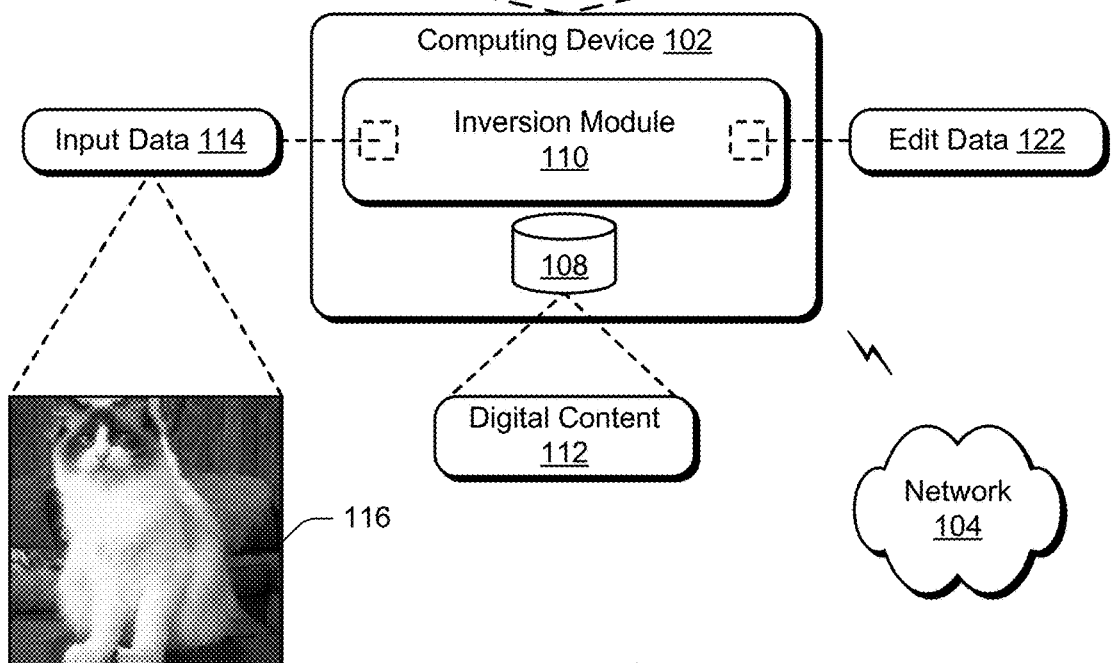

Different latent spaces have different inversion capabilities, and selection of a latent space involves a tradeoff between editability of a generated image and reconstruction of an input image. Due to this constraint, conventional systems for GAN inversion are limited to editing images that depict relatively simple objects such as faces that are relatively easy to reconstruct. Conventional systems are not capable of accurately editing images depicting foreground objects against complex backgrounds or unique foreground objects such as a unique cat, a unique car, a unique horse, and so forth. The inability of conventional systems to accurately edit images depicting complex or unique scenes is a shortcoming of these systems.

In order to overcome the limitations of conventional systems, techniques and systems for image inversion using multiple latent spaces are described. In one example, a computing device implements an inversion system to generate a segment map that segments an input digital image into image regions including a first image region and a second image region. In this example, the segment map assigns the first image region to a first latent space and the second image region to a second latent space that corresponds to a layer of a convolutional neural network. For example, the inversion system generates the segment map using a machine learning model trained on training data to receive an image as an input and predict invertibility of the image in five different latent spaces $\Phi=\{W^+, F_4, F_6, F_8, F_{10}\}$ as an output.

The segment map assigns each of the image regions to a latent space of the latent spaces $\Phi$ that is the most editable ($W^+$ being the most editable candidate latent space and $F_{10}$ being the least editable candidate latent space) with a predicted invertibility above a threshold $\tau$ for the image region. For example, the inversion system selects the threshold $\tau$ such that inversion is perceptually close to the input digital image without sacrificing editability. An inverted latent representation of the input digital image is computed using a binary mask for the second image region.

For instance, the inversion system predicts a change in a feature value to be added to a feature block of the corresponding layer of the convolutional neural network for the second image region. The inversion system then modulates the predicted change in the feature value and the binary mask in order to compute the inverted latent representation of the input digital image. To edit the input digital image, the inversion system modifies the inverted latent representation of the input digital image using an edit direction vector that corresponds to a visual feature. For example, the visual feature is a color feature, a pose feature, a size feature, and so forth.

An output digital image is generated that depicts a reconstruction of the input digital image having the visual feature based on the modified inverted latent representation of the input digital image. Instead of being limited to inverting images in a single latent space as in conventional systems, the described systems assign each image region to a latent space that is the earliest latent space which meets the threshold $\tau$. By performing image inversion using multiple latent spaces in this way, the described systems are capable of editing digital images that depict complex backgrounds and unique foreground objects which is not possible using conventional systems.

An encoder-based implementation of the described systems outperforms encoder-based implementations of conventional systems in an evaluation performed on three different image datasets. Similarly, an optimization-based implementation of the described systems outperforms optimization-based implementations of conventional systems in an evaluation on the three different datasets. The optimization-based implementation of the described systems achieves superior reconstruction of input images in a shorter amount of time than the conventional systems which is a further improvement over these systems.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and an inversion module 110. The storage device 108 is illustrated to include digital content 112 such as digital images, digital videos, etc.

The inversion module 110 is illustrated as having, receiving, and/or transmitting input data 114. The input data 114 describes digital images such as digital photographs. In the illustrated example, the input data 114 describes a digital image 116 which depicts a cat. The cat depicted in the digital image 116 is lightly colored (e.g., white) except for a small amount of dark coloring at the top of the cat's head. As shown, the cat is depicted in the digital image 116 as sitting on its back legs with its front legs partially extended.

The inversion module 110 processes the input data 114 to generate an inverted digital image 118 which is displayed in a user interface 120 of the display device 106 by projecting the digital image 116 into a latent space or multiple latent spaces of a pretrained generative adversarial network. In one example, the inversion module 110 generates the inverted digital image 118 by projecting the digital image 116 into a latent space as described by Karras et al., *Analyzing and Improving the Image Quality of StyleGAN*, arXif1912.04958v2 [cs.CV] (23 Mar. 2020). To do so in one example, the inversion module 110 projects the digital image 116 into the latent space or the multiple latent spaces to generate the inverted digital image 118 such that invertibility and editability are both maximized.

As used herein, the term "invertibility" refers to an indication of reconstruction quality or how closely a generated result image is capable of reconstructing or matching an input image. As used herein, the term "editability" refers an indication of modification quality or how realistic a generated result image is capable of appearing with visual features that differ from visual features of an input image. It is to be appreciated that there is an inherent tradeoff between invertibility and editability. For instance, latent spaces such as W or $W^+$ or earlier layers of a convolutional neural network often allow flexible global and local editing, while they cannot faithfully reconstruct images. It is also to be appreciated that no single latent space is capable of simultaneously maximizing invertibility and editability.

For example, a latent space $W^+$ is usable to invert the digital image 116 and generate the inverted digital image 118 in a manner that the generated inverted digital image 118 has high editability but low invertibility. However, a latent space corresponding to activation block $F_{10}$ (which is close to a generated pixel space) is usable to invert the digital image 116 and generate the inverted digital image 118 such that the inverted digital image 118 has high invertibility but low editability. Unlike conventional systems which are limited to generating the inverted digital image 118 using a single latent space, the inversion module 110 generates the inverted digital image 118 using multiple latent spaces.

In one example, the inversion module 110 segments the digital image 116 into image regions such that a portion of the digital image 116 depicting the cat is a first image region and the background or the remaining portion of the digital image 116 is a second image region. The inversion module 110 then selects a latent space from latent spaces Φ for each of the image regions that is the most editable ($W^+$ being the most editable candidate latent space and $F_{10}$ being the least editable candidate latent space) with a predicted invertibility above a threshold τ for the image region. For example, the inversion module 110 considers five latent spaces $\Phi=\{W^+, F_4, F_6, F_8, F_{10}\}$. However, it is to be appreciated that in some examples, the inversion module 110 considers more than five latent spaces or less than five latent spaces. In other examples, the inversion module 110 considers different particular latent spaces.

The inversion module 110 selects latent space $W^+$ for the first image region (the cat) of the digital image 116 and selects latent space $F_4$ for the second image region (the background) of the digital image 116. In an example, the inversion module 110 inverts the first image region in the latent space $W^+$ and inverts the second image region in the latent space $F_4$. The inversion module 110 then combines the inverted first image region and the inverted second image region as the inverted digital image 118.

For example, the inversion module 110 directly predicts $w^+ \in W^+$. In this example, and for the intermediate layer feature spaces, $F=\{F_4, F_6, F_8, F_{10}\}$, the inversion module 110 predicts a change in the layer's feature values Δf for the image region to be inverted in that layer. An output feature value is a combination of both $w^+$ and Δf masked by a binary mask indicating which image region is to be inverted in that layer. For instance, this combination is an inverted latent representation of the digital image 116 which the inversion module 110 provides as an input to a pretrained convolutional neural network to generate the inverted digital image 118.

By generating the inverted latent representation of the digital image 116 using multiple latent spaces in this way, the inversion module 110 optimizes both invertibility and editability which is not possible using a single latent space as in conventional approaches. The inversion module 110 is illustrated as having, receiving, and/or transmitting edit data 122 that describes edit direction vectors usable to traverse semantically meaningful directions that correspond to visual features. Examples of visual features that are generatable using the edit direction vectors described by the edit data 122 include pose changes, color changes, size changes, and so forth.

Consider an example in which the inversion module 110 modifies the inverted latent representation of the digital image 116 using an edit direction vector described by the edit data 122 which corresponds to a visual feature. In this example, the inversion module 110 provides the modified inverted latent representation of the digital image 116 as an input to the pretrained convolutional neural network to generate a digital image which depicts a reconstruction of the digital image 116 having the visual feature. For example, the inversion module 110 processes the edit data 122 to modify the inverted latent representation of the digital image 116 using an edit direction vector that corresponds to a color feature. The inversion module 110 provides the modified inverted latent representation of the digital image 116 as an input to the pretrained convolutional neural network to generate a digital image 124. As shown, the digital image 124 depicts a reconstruction of the digital image 116 having the color feature which causes the light-colored cat depicted in the digital image 116 to appear as a darkly colored cat in the digital image 124.

In another example, the inversion module 110 processes the edit data 122 to modify the inverted latent representation of the digital image 116 using an edit direction vector that corresponds to a size feature. In this example, the inversion module 110 then processes the modified inverted latent representation of the digital image 116 using the pretrained convolutional neural network to generate a digital image 126. The digital image 126 depicts an enlarged version of the cat depicted in the digital image 116.

For example, the inversion module 110 modifies the inverted latent representation of the digital image 116 using an edit direction vector described by the edit data 122 that corresponds to a pose feature. The inversion module 110 then processes the modified inverted latent representation of the digital image 116 using the pretrained convolutional neural network which generates a digital image 128. As shown in the user interface 120, the digital image 128 depicts the cat in a pose that is different from a pose of the cat depicted in the digital image 116. For instance, in the digital image 116, the cat is looking forward and sitting down; however, in the digital image 128, the cat is standing and looking slightly up and to the cat's left side (towards the right side of the digital image 128).

By inverting the first image region of the digital image 116 (the cat) in the latent space $W^+$ and inverting the second image region of the digital image 116 (the background) in the latent space $F_4$, the inversion module 110 generates the inverted latent representation of the digital image 116 such that invertibility and editability are both maximized. In this manner, the inverted latent representation of the digital image 116 is usable to accurately reconstruct the digital image 116 and is also usable to generate the digital images 124-128 which depict meaningful and realistic looking visual features that are not depicted in the digital image 116. Compared to conventional systems that are limited to inverting an entire digital image in a single latent space, the described systems achieve superior reconstruction of digital images in a shorter amount of time (e.g., consuming less computational resources of the computing device 102).

Figure 2:
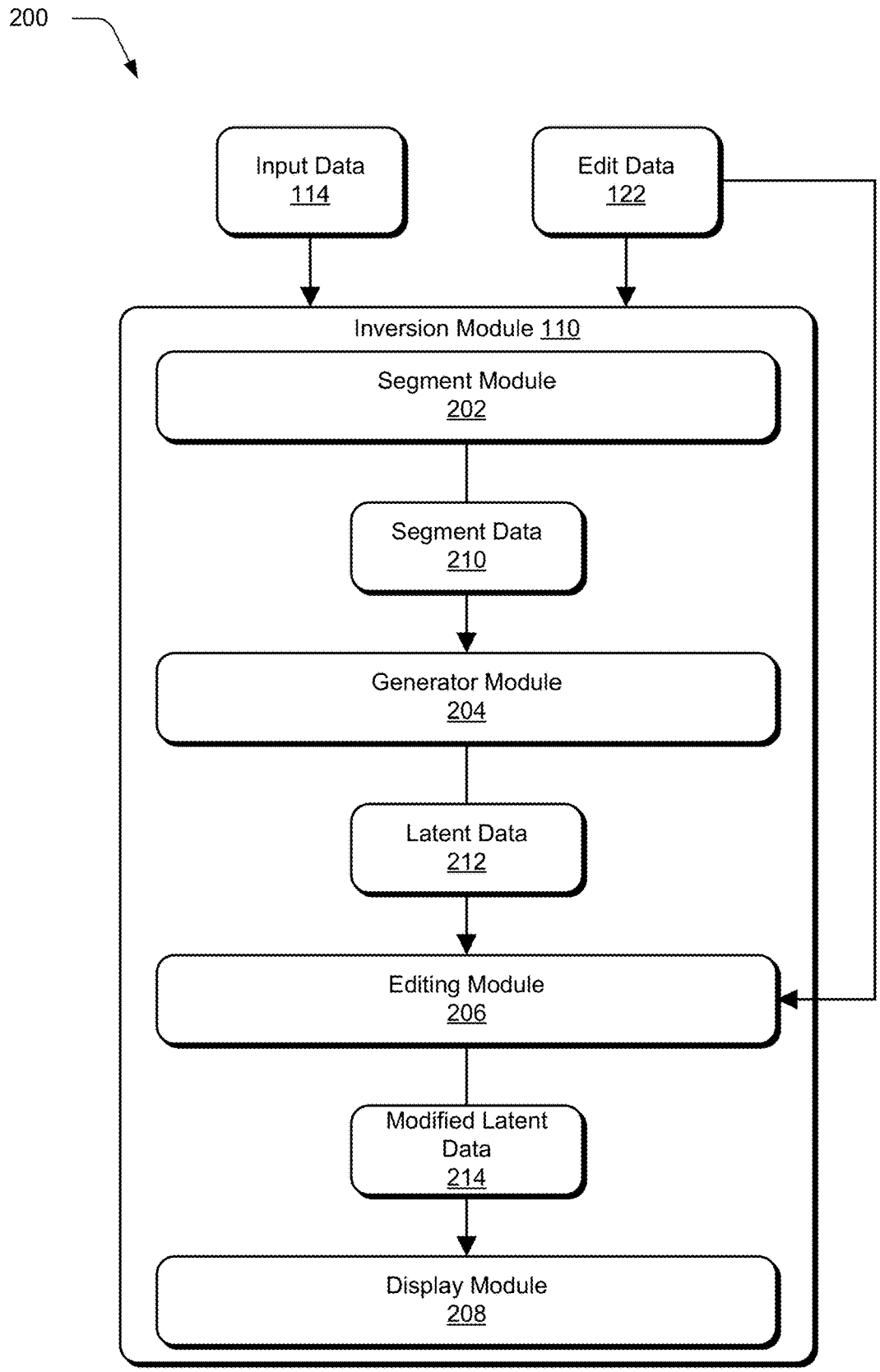
FIG. 2 depicts a system in an example implementation showing operation of an inversion module for image inversion using multiple latent spaces.

FIG. 2 depicts a system 200 in an example implementation showing operation of an inversion module 110. The inversion module 110 is illustrated to include a segment module 202, a generator module 204, an editing module 206, and a display module 208. The inversion module 110 receives the input data 114 describing digital images and the edit data 122 describing edit direction vectors as inputs in one example. For example, the segment module 202 receives the input data 114 and the segment module 202 processes the input data 114 to generate segment data 210.

Figure 3A:
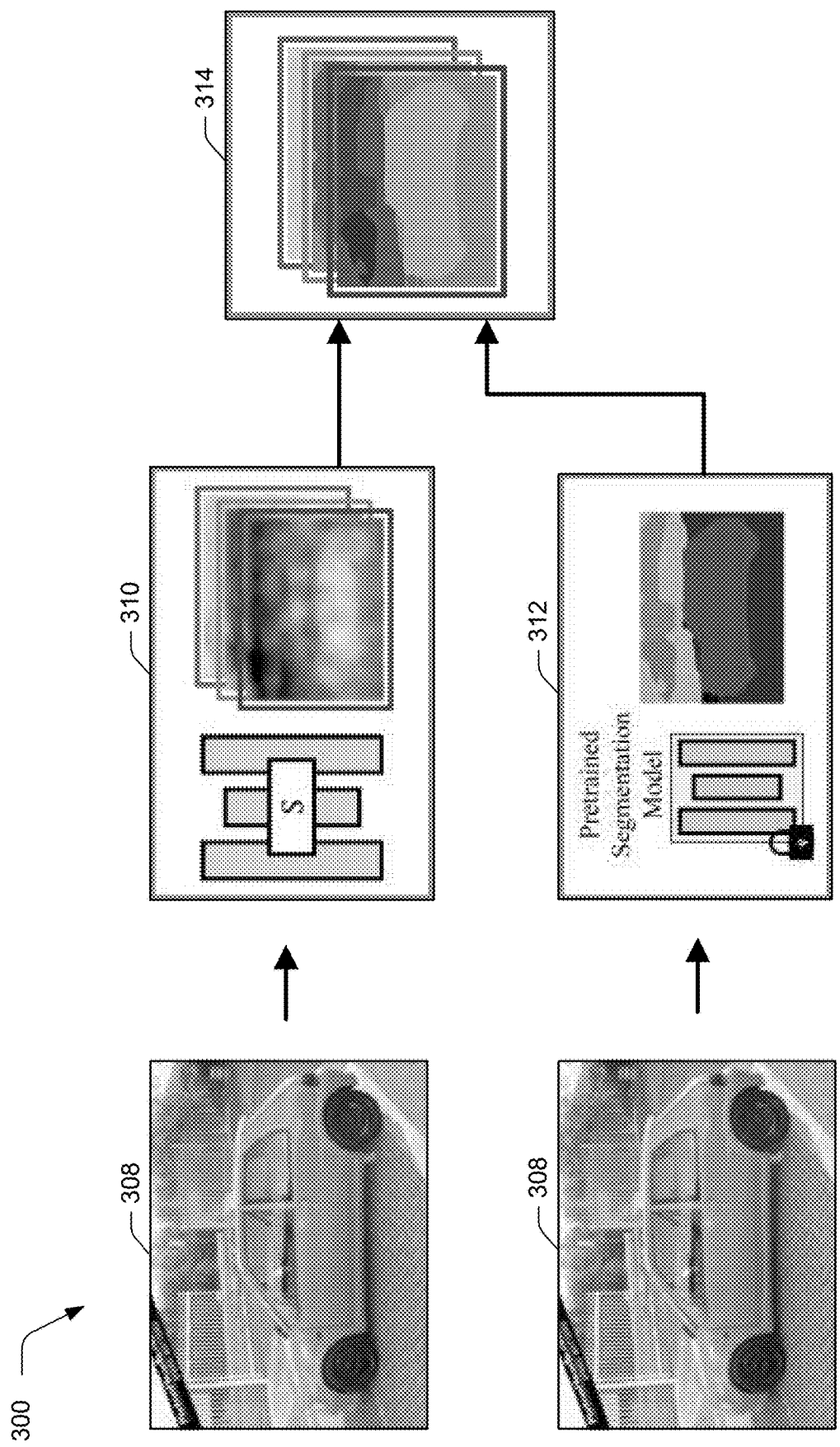
FIGS. 3A, 3B, 3C, and 3D illustrate an example of generating an inverted latent representation of an input digital image and modifying the inverted latent representation using an edit direction vector.
Figure 3B:
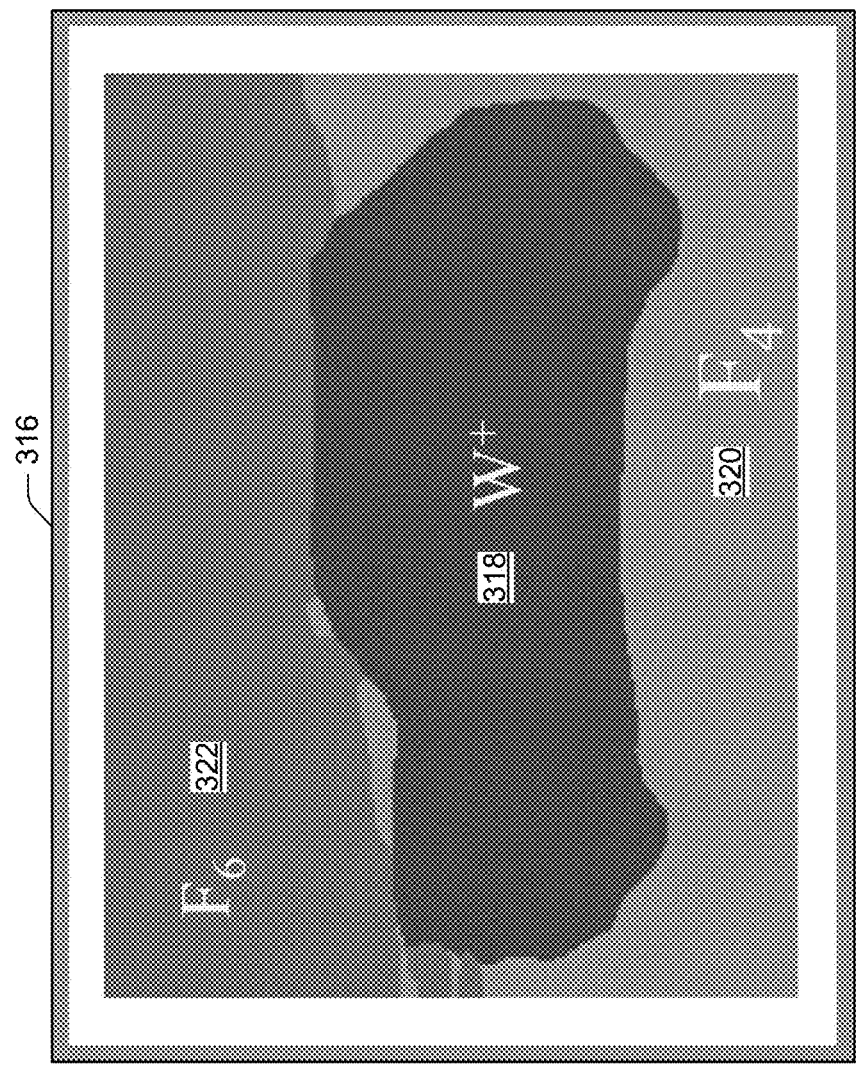
Figure 3C:
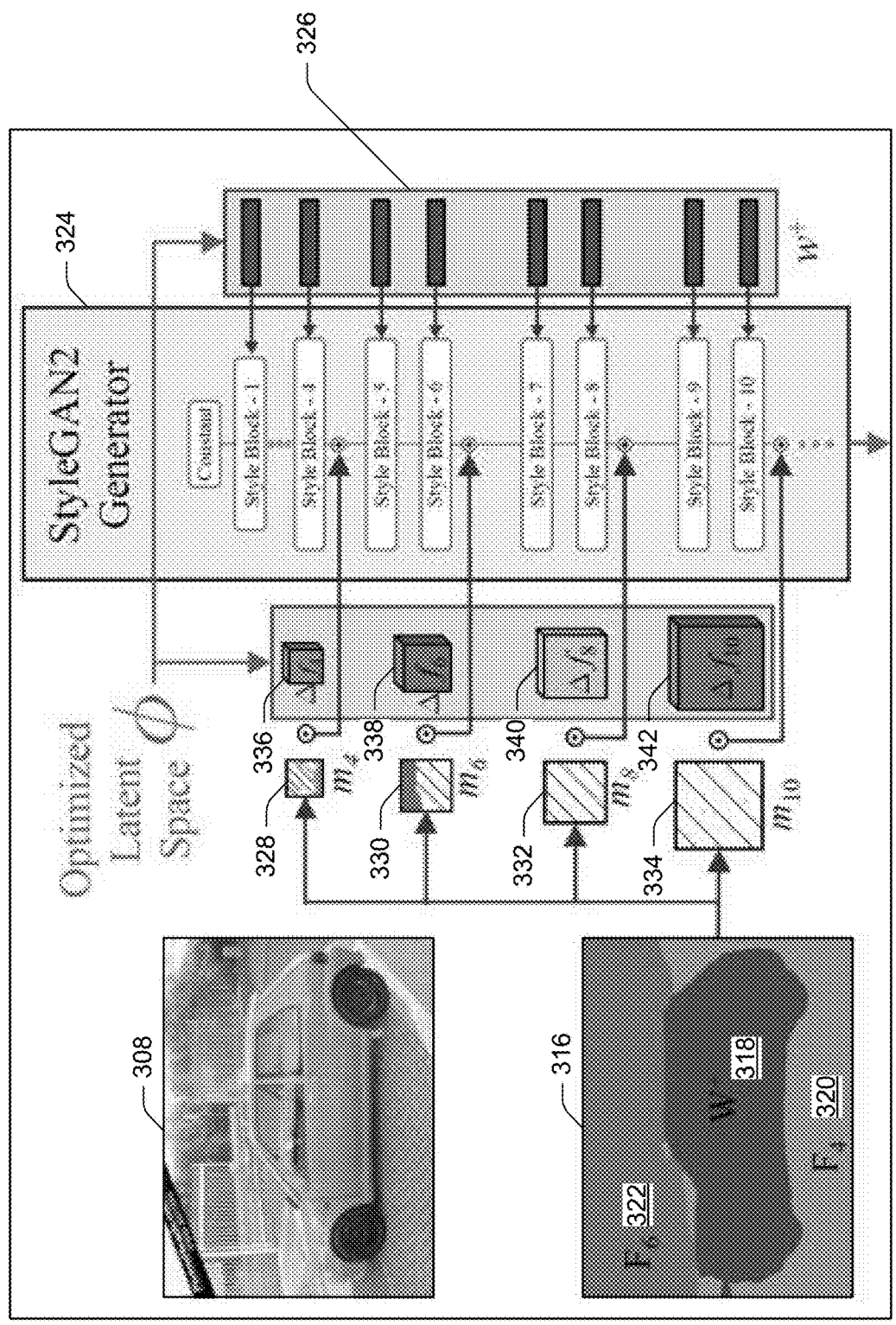
Figure 3D:
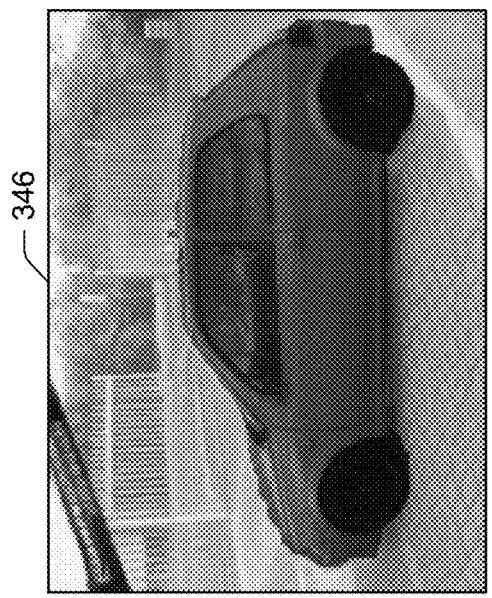
Figure 3D:
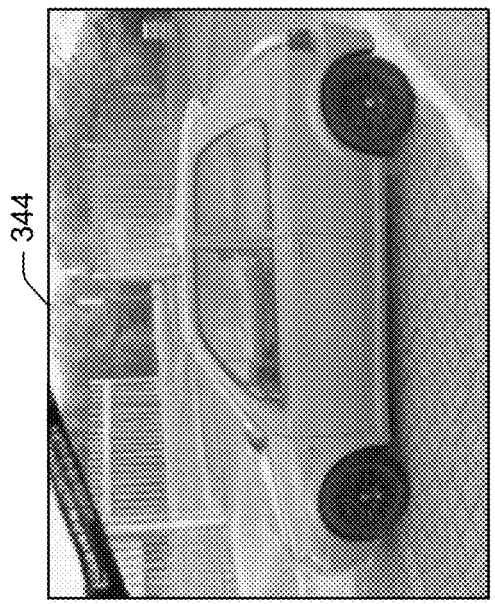

FIGS. 3A, 3B, 3C, and 3D illustrate an example of generating an inverted latent representation of an input digital image and modifying the inverted latent representation using an edit direction vector. FIG. 3A illustrates a representation 300 of refining predicted inversions of image regions generated by a trained machine learning model using a pretrained semantic segmentation network. FIG. 3B illustrates a representation 302 of a segment map that segments an input digital image into image regions and assigns each of the image regions to a latent space. FIG. 3C illustrates a representation 304 of generating an inverted latent representation of the input digital image using multiple latent spaces. FIG. 3D illustrates a representation 306 of an inverted digital image generated by processing the inverted latent representation of the input digital image using a pretrained convolutional neural network.

With reference to FIG. 2 and FIG. 3A, the representation 300 includes an input digital image 308 that depicts light-colored car on a brick road with trees in a background which also includes a light-colored fence disposed between the light-colored car and the trees. For example, the segment module 202 receives the input data 114 as describing the input digital image 308. For instance, the segment module 202 includes a machine learning model 310.

As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

In this example, the machine learning model 310 is trained on training data to receive any digital image as an input and generate a predicted invertibility (e.g., in a feed-forward fashion) for image regions of the digital image for five latent spaces $\Phi=\{W^+, F_4, F_6, F_8, F_{10}\}$. An example of training the machine learning model on the training data is described with respect to FIG. 5. In one example, the machine learning model shares a common backbone with different prediction heads corresponding to each of the five latent spaces $\Phi=\{W^+, F_4, F_6, F_8, F_{10}\}$.

The segment module 202 also includes a pretrained semantic segmentation network 312. For example, predicted invertibilities generated using the trained machine learning model 310 for the input digital image 308 are noisy in some instances such that different parts of a single image region of the input digital image 308 are assigned to different ones of the five latent spaces $\Phi=\{W^+, F_4, F_6, F_8, F_{10}\}$. Because this could result in inconsistent inversions and edits, the segment module 202 refines the predicted invertibilities generated by the machine learning model 310 using the pretrained semantic segmentation network 312.

In one example, for each of the image regions of the input digital image 308, the segment module 202 computes an average predicted invertibility in the image region and uses a value of the average predicted invertibility for the entire image region. By using the pretrained semantic segmentation network 312 to refine the invertibility predictions of the machine learning model 310, the segment module 202 determines refined invertibility predictions 314. As shown, the refined invertibility predictions 314 align the different average values of the predicted inversions with natural object boundaries depicted in the input digital image 308.

The segment module 202 leverages the refined invertibility predictions 314 to generate a segment map 316 which is illustrated in the representation 302 of FIG. 3B. To do so in one example, the segment module 202 selects, for each of the image regions of the input digital image 308, a most editable one of the five latent spaces $\Phi=\{W^+, F_4, F_6, F_8, F_{10}\}$ that has a predicted invertibility above a threshold τ for the image region. For instance, the segment module 202 determines a value for the threshold τ empirically such that a particular inversion is perceptually close to the input digital image 308 without unnecessarily sacrificing editability.

In the illustrated example, the segment map 316 segments the input digital image 308 into three image regions 318-322 and assigns image region 318 to the $W^+$ latent space; image region 320 to the $F_4$ latent space; and image region 322 to the $F_6$ latent space. For example, the image region 318 that includes the relatively simple car object in the input digital image 308 is assigned to a native latent space $W^+$. However, the image region 320 and the image region 322 which correspond to difficult to generate backgrounds depicted in the digital image 308 are assigned to later $F_4$ and $F_6$ latent spaces, respectively.

The segment module 202 generates the segment data 210 as describing the segment map 316. The generator module 204 receives and processes the segment data 210 to generate latent data 212. For example, the generator module 204 includes a convolutional neural network 324 which is illustrated in FIG. 3C. In an example, the convolutional neural network 324 is a StyleGAN2 generator as described by Karras et al., *Analyzing and Improving the Image Quality of StyleGAN*, arXif:1912.04958v2 [cs.CV] (23 Mar. 2020).

For example, the inversion module 110 performs image inversion using multiple latent spaces in an optimization-based setting and in an encoder-based setting. The goal of both approaches is to find a latent space that reconstructs the input digital image 308 accurately while also maintaining editability. For the optimization-based approach, the inversion module 110 directly optimizes a latent space $\Phi$ for the input digital image 308.

For the encoder-based approach, the inversion module 110 trains a separate encoder for each of the five latent spaces $\Phi=\{W^+, F_4, F_6, F_8, F_{10}\}$. The encoder-based setting receives the input digital image 308 and the segment map 316 as an input to predict latent space. Each encoder in the encoder-based setting receives a four channel input which is an input digital image concatenated with a corresponding binary mask. The encoder that predicts the vector $w^+$ is initialized with a pretrained encoder. The encoders that predict $\{F_4, F_6, F_8, F_{10}\}$ have a ResNet-18 architecture with three changes: (1) the first convolution layer is modified to have four channels; (2) ResNet-18 layers are only retained until there is a match in the spatial resolution corresponding to a latent space being inverted; and (3) a convolution layer is added to match a number of channels of the latent space. For example, the encoder-based approach is faster than the optimization-based approach but the encoder-based approach is less accurate than the optimization-based approach for inversion.

FIG. 3C illustrates how the optimized latent codes (e.g., from the optimization-based approach) or the predicted latent codes (e.g., from the encoder-based approach) are combined to generate an inverted latent representation of the input digital image 308. As shown, the generator module 204 uses predicted $w^+ \in W^+$ for the image region 318 directly. For the intermediate layer feature spaces, $F=\{F_4, F_6, F_8, F_{10}\}$, the generator module 204 predicts a change in the layer's feature values Δf for the image region to be inverted in that layer. An output feature value is a combination of both $w^+$ and Δf masked by a binary mask indicating which image region is to be inverted in that layer.

For instance, the generator module 204 generates a binary mask 328 for the image region 320. The binary mask 328 is a one-hot mask with the image region 320 set to 1 and the rest of the binary mask 328 set to 0. Similarly, the generator module 204 generates a binary mask 330 for the image region 322 which is also a one-hot mask with the image region 322 set to 1 and the rest of the binary mask 330 set to 0. In the illustrated example, the generator module 204 generates a binary mask 332 that is entirely set to 0 and a binary mask 334 that is also entirely set to 0. This is because the segment map 316 does not assign any portion of the input digital image 308 to the $F_8$ space or the $F_{10}$ space. For instance, if the segment map 316 assigned an image region of the input digital image 308 to the $F_8$ space, then the binary mask 332 would include that image region set to 1. Similarly, if the segment map 316 assigned an image region of the input digital image 308 to the $F_{10}$ space, then the binary mask 334 would include that image region set to 1.

The generator module 204 predicts a change $\Delta f_4$ 336 for the image region 320 because the image region 320 is to be inverted in a corresponding layer of the convolutional neural network 324. The generator module 204 predicts a change $\Delta f$ for an image region to be inverted in a corresponding layer of the convolutional neural network 324 rather than predicting the feature itself because propagating the features from the earlier layers already provides a meaningful initialization from which to adjust. Similarly, the generator module 204 predicts a change $\Delta f_6$ 338 for the image region 322, a change $\Delta f_8$ 340, and a change $\Delta f_{10}$ 340.

The generator module 204 then computes features for the inverted latent representation of the input digital image 308 which is representable as:

$f_4 = g_{0 \to 4}(c, w^+) + m_4 \odot \Delta f_4;$ $f_6 = g_{4 \to 6}(f_4, w^+) + m_6 \odot \Delta f_6;$ $f_8 = g_{6 \to 8}(f_6, w^+) + m_8 \odot \Delta f_8;$ $f_{10} = g_{8 \to 10}(f_8, w^+) + m_{10} \odot \Delta f_{10};$ $\hat{x} = g_{10 \to 16}(f_{10}, w^+).$ where: $g_{i \to j}$ denotes the module from the i-th to the j-th layers in the convolutional layers of the convolutional neural network 324 (note $g_{i \to j}$ is modulated by the corresponding part of the extending latent code $w^+$); c is the input constant tensor used in StyleGAN2; m is the refined, predicted invertibility mask bilinearly downsampled to a corresponding tensor size; and $\odot$ denotes a Hadamard product.

For example, the generator module 204 uses objective functions to optimize the latent code $\Phi = \{w^+, \Delta f_4, \Delta f_6, \Delta f_8, \Delta f_{10}\}$. In this example, the generator module 204 reconstructs the input digital image 308 while regularizing the latent space (in order to be meaningful for downstream editing tasks). In one example, this includes reconstruction losses which are representable as:

$\mathcal{L}_{rec} = \ell_2(x, \hat{x}) + \lambda_{LPIPS} \mathcal{L}_{LPIPS}(x, \hat{x})$ where: x is the input digital image 308; $\hat{X}$ is an inverted image and the $\mathcal{L}_2$ distance between $\hat{x}$ and x and is used as a reconstruction loss along with a Learned Perceptual Image Patch Similarity (LPIPS); and $\lambda_{LPIPS}$ is a weight term.

For $w^+$, the generator module uses the following regularization loss:

$$\mathcal{L}_W = \sum_n^N [(\hat{w}_n - \mu)^T \Sigma (\hat{w}_n - \mu) + \|w_n^+ - w_0^+\|^2]$$

where: $w_n^+$ is the $n^{th}$ component of the $w^+$ vector; $w^+ = \text{LeakyReLU}(w_n^+, 5.0)$; $\mu$ and $\Sigma$ are the empirical mean and covariance matrix of randomly sampled W space vectors, respectively. The first term applies a multivariate Gaussian prior to each component and the second term minimizes variation between the individual style codes and the first style code.

For the feature space, the generator module 204 enforces the predicted change $\Delta f$ to be small so the final feature value does not deviate much from the original value which is representable as:

$$\mathcal{L}_F = \sum_{\Delta f \in \phi \setminus w^+} \|\Delta f\|^2$$

The full objective is representable as:

$\arg \min_\Phi \mathcal{L}_{rec} + \lambda_W \mathcal{L}_W + \lambda_F \mathcal{L}_F$ where: $\lambda_W$ and $\lambda_F$ control the weights of each term.

The generator module 204 generates an inverted image 344 using the inverted latent representation of the input digital image 308 and generates the latent data as describing the inverted latent representation of the input digital image 308 and/or the inverted image 344 which is depicted in FIG. 3D. The editing module 206 receives the latent data 212 and the edit data 122 and the editing module 206 processes the latent data 212 and/or the edit data 122 to generate modified latent data 214. In one example, the editing module 206 utilizes systems described by Erik Härkönen et al., *Ganspace: Discovering Interpretable GAN Controls*, In Advances in Neural Information Processing Systems, 3, 5 (2020) and by Or Patashnik et al., *Styleclip: Text-Driven Manipulation of StyleGAN Imagery*, In Proceedings of the IEEE/CVF International Conference on Computer Vision, 1, 3, 5, (2021) for finding an editing direction $\delta w^+$ in the $W^+$ latent space.

In this example, image regions inverted in the $W^+$ latent space are modulated by an entire $w^+ + \delta w^+$. In another example, image regions inverted in intermediate feature spaces $\{F_4, F_6, F_8, F_{10}\}$ are modulated by $w^+ + \delta w^+$ for layers which come after that feature space layer. For example, image regions inverted in $F_{10}$ feature space are modulated by $w^+$ for layers until a 10th layer, and these the image regions are modulated by $w^+ + \delta w^+$ for layers afterward. In one example, this ensures that an inverted feature is compatible with $w^+ + \delta w^+$.

As noted above, the edit data 122 describes edit direction vectors that correspond to visual features in some examples. For instance, the editing module 206 processes the edit data 122 and modifies the inverted latent representation of the input digital image 308 using an edit direction vector that corresponds to a color feature. The editing module 206 generates the modified latent data 214 as describing the modified inverted latent representation of the input digital image 308. As illustrated in FIG. 2 and FIG. 3D, the display module 208 receives and processes the modified latent data 214 to generate an output digital image 346 that depicts a reconstruction of the input digital image 308 having the color feature.

As shown, the light-colored car depicted in the input digital image 308 is depicted as a dark-colored car in the output digital image 346. However, the light-colored fence depicted in the input digital image 308 is also depicted as a light-colored fence in the output digital image 346. By generating the inverted image 344 using multiple latent spaces in this way, the described systems maximize both invertibility (e.g., accurate reconstruction) and editability. In the illustrated example, the light-colored fence depicted in the output digital image 346 is representative of invertibility and the dark-colored car depicted in the output digital image 346 is representative of editability.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 4:
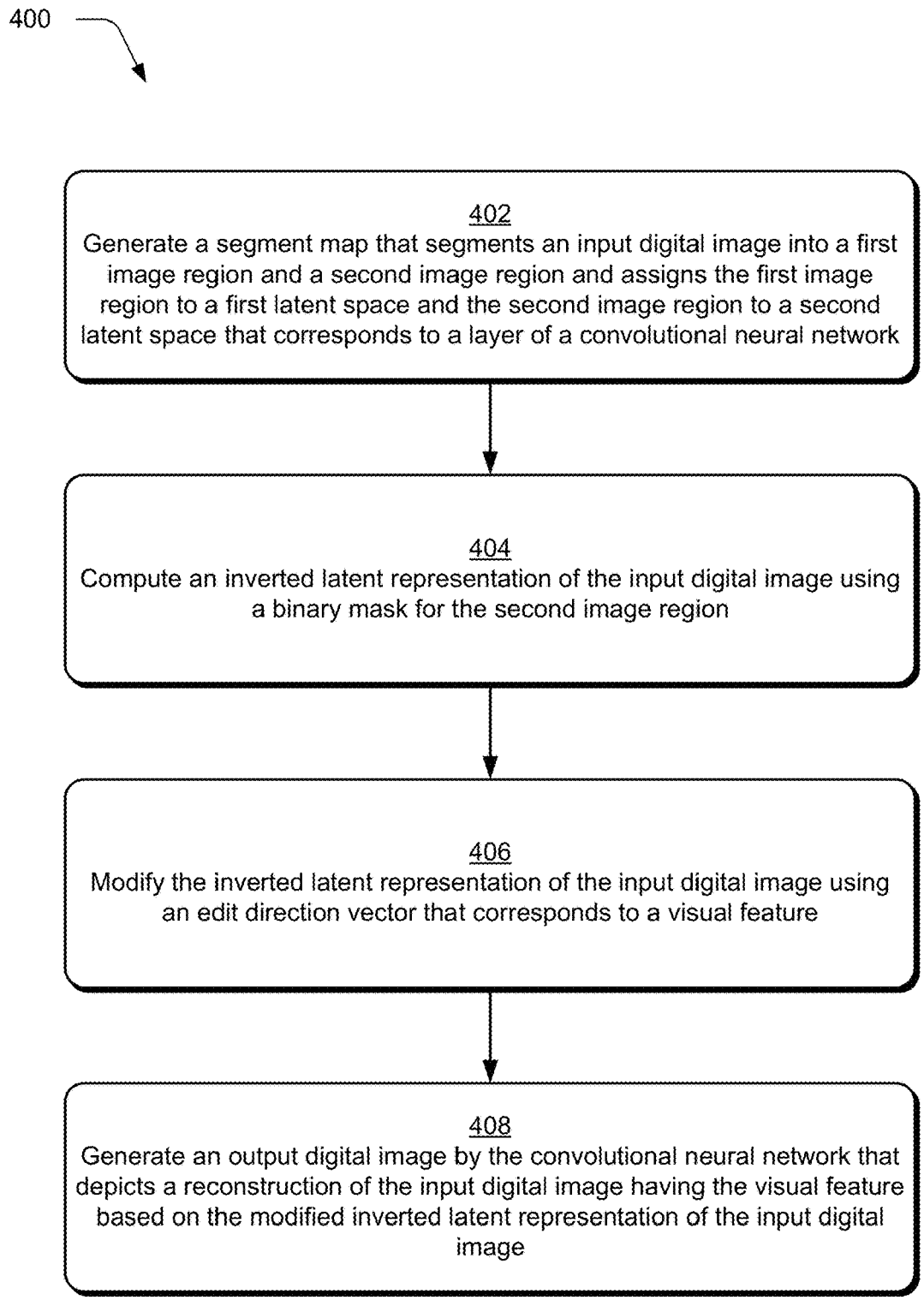
FIG. 4 is a flow diagram depicting a procedure in an example implementation in which a segment map is generated that segments an input image into a first image region and a second image region and assigns the first image region to a first latent feature space and the second image region to a second latent feature space.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-3. FIG. 4 is a flow diagram depicting a procedure 400 in an example implementation in which a segment map is generated that segments an input image into a first image region and a second image region and assigns the first image region to a first latent feature space and the second image region to a second latent feature space.

A segment map is generated that segments an input digital image into a first image region and a second image region and assigns the first image region to a first latent space and the second image region to a second latent space that corresponds to a layer of a convolutional neural network (block 402). For example, the computing device 102 implements the inversion module 110 to generate the segment map. An inverted latent representation of the input digital image is computed using a binary mask for the second image region (block 404). The inversion module 110 computes the inverted latent representation of the input digital image in some examples.

The inverted latent representation of the input digital image is modified using an edit direction vector that corresponds to a visual feature (block 406). In one example, the computing device 102 implements the inversion module 110 to modify the inverted latent representation of the input digital image. An output digital image is generated by the convolutional neural network that depicts a reconstruction of the input digital image having the visual feature based on the modified inverted latent representation of the input digital image (block 408). For example, the inversion module 110 generates the output digital image using the convolutional neural network.

Figure 5:
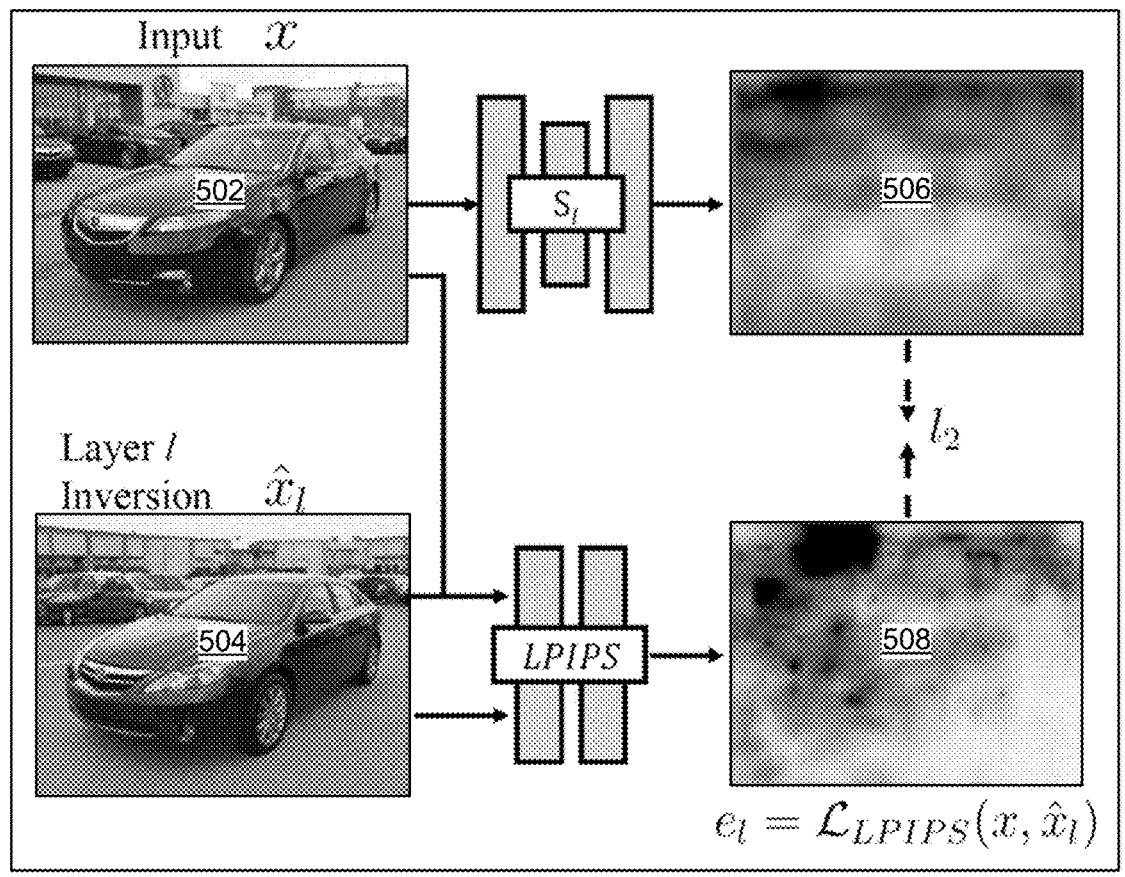
FIG. 5 illustrates an example representation of training a machine learning model to predict latent space assignments for regions of images.

FIG. 5 illustrates an example representation 500 of training a machine learning model to predict latent space assignments for regions of images. A training dataset of digital image pairs is used for training the machine learning model and each of the digital image pairs includes an input image 502 $x \in R^{H \times W \times 3}$ and an inverted image 504 $\hat{x}_l \in R^{H \times W \times 3}$ which is reconstructed from a projection in the lth latent space. As noted above, five latent spaces $\Phi = \{W^+, F_4, F_6, F_8, F_{10}\}$ are considered where the index F is the feature index of the convolutional neural network 324 (e.g., StyleGAN2) and $W^+$ is a concatenation of different vectors from W space. W space is an output space of a multilayer perceptron network of StyleGAN2. For example, $W^+$ is used rather than W because $W^+$ provides better inversion results and more fine-grained control when performing downstream edits.

A reconstruction loss is computed as $e_l = \mathcal{L}_{LPIPS}(x, \hat{x}_l)$ where $e_l \in R^{H \times W}$ is a learned perceptual image patch similarity spatial error map between x in latent space 506 and $\hat{X}_l$ in latent space 508. The machine learning model is trained on the training dataset to predict invertibility for each of the five latent spaces $\Phi = \{W^+, F_4, F_6, F_8, F_{10}\}$ using the learned perceptual image patch similarity spatial error map and an $\ell_2$ loss function which is representable as:

$$S_l = \arg \min_{S_l} \ell_2(S_l(x), e_l)$$

Figure 6:
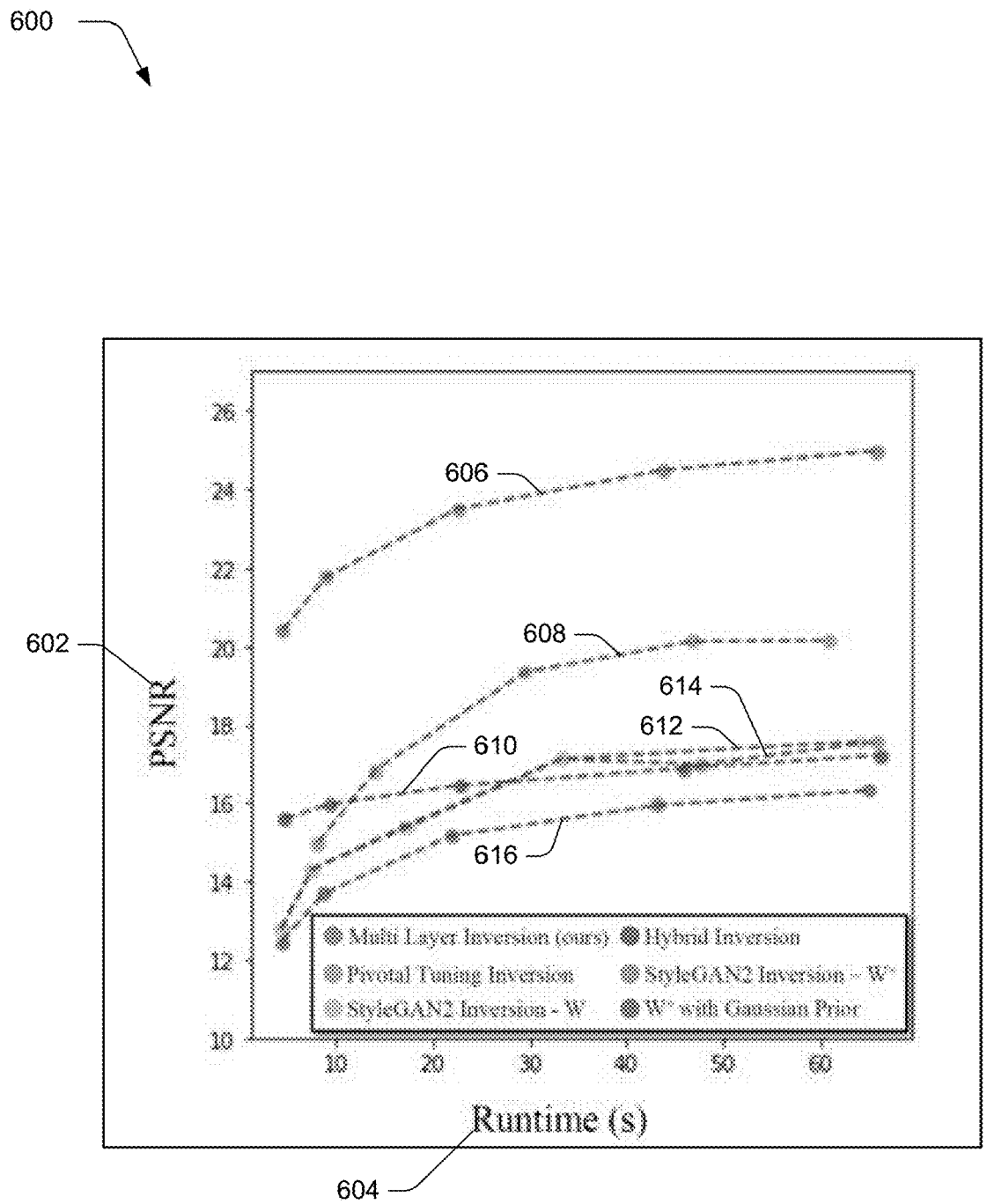
FIG. 6 illustrates a representation of reconstruction improvements of image inversion using multiple latent spaces compared to conventional systems and techniques.

FIG. 6 illustrates a representation 600 of reconstruction improvements of image inversion using multiple latent spaces compared to conventional systems and techniques. The representation 600 depicts a comparison between input images and reconstructed images computed as a peak signal-to-noise ratio (PSNR) 602 which is a quality measurement between an input image and a corresponding reconstructed image. PSNR 602 is presented versus runtimes 604 for the described systems 606 and multiple conventional systems 608-616. As shown, the described systems 606 achieve superior reconstruction of input images in a shorter amount of time than Pivotal Tuning Inversion 608, Hybrid Inversion 610, StyleGAN2 Inversion—W 612; StyleGAN2 Inversion—$W^+$ 614; and $W^+$ with Gaussian Prior 616.

Improvement Examples

Figure 7:
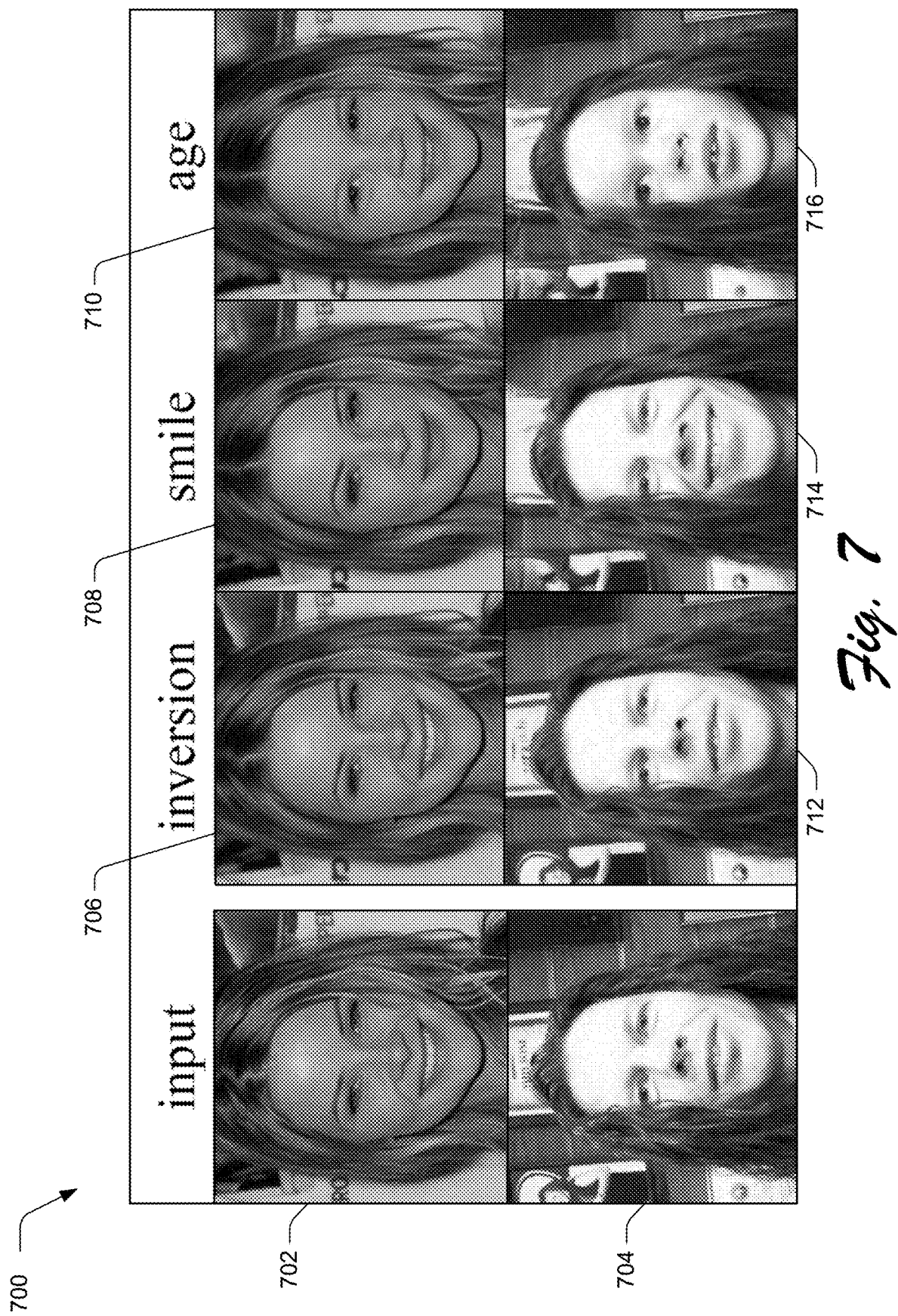
FIG. 7 illustrates an example representation of images generated by inverting input images using multiple latent spaces.

FIG. 7 illustrates an example representation 700 of images generated by inverting input images using multiple latent spaces. The representation 700 includes a first digital image 702 and a second digital image 704. As shown, the first digital image 702 depicts a woman's face and the second digital image 704 depicts a man's face. The inversion module 110 processes the first digital image 702 and generates a segment map that segments the first digital image 702 into image regions. The segment map also assigns each of the image regions to a latent feature space. The inversion module 110 computes an inverted latent representation of the first digital image 702 and generates an inverted digital image 706 using the inverted latent representation of the first digital image 702.

For example, the inversion module 110 modifies the inverted latent representation of the first digital image 702 using an edit direction vector that corresponds to a smile feature. In this example, the inversion module 110 generates an output digital image 708 that depicts a reconstruction of the first digital image 702 having the smile feature based on the modified inverted latent representation of the first digital image 702. In another example, the inversion module 110 modifies the inverted latent representation of the first digital image 702 using an edit direction vector that corresponds to an age feature. As shown, the inversion module 110 generates an output digital image 710 that depicts a reconstruction of the first digital image 702 having the age feature based on the modified inverted latent representation of the first digital image 702.

For instance, the inversion module 110 processes the second digital image 704 to generate a segment map that segments the second digital image 704 into image regions using the trained machine learning model and the pretrained semantic segmentation network. In an example, the segment map assigns each of the image regions to one of the five latent spaces $\Phi=\{W^+, F_4, F_6, F_8, F_{10}\}$. The inversion module 110 computes an inverted latent representation of the second digital image 704 and generates an inverted digital image 712 using the inverted latent representation of the second digital image 704 and the convolutional neural network 324.

In one example, the inversion module 110 modifies the inverted latent representation of the second digital image 704 using an edit direction vector that corresponds to a smile feature. The inversion module 110 generates an output digital image 714 based on the modified inverted latent representation of the second digital image 704. As illustrated in FIG. 7, the output digital image 714 depicts a reconstruction of the second digital image 704 having the smile feature. In another example, the inversion module 110 modifies the inverted latent representation of the second digital image 704 using an edit direction vector that corresponds to an age feature. In this example, the inversion module 110 generates an output digital image 716 based on the modified inverted latent representation of the second digital image 704. As shown, the output digital image 716 depicts a reconstruction of the second digital image 704 having the age feature.

As noted above, the described systems for image inversion using multiple latent spaces are implemented in an optimization-based approach and an encoder-based approach. Table 1 below presents results of a comparison of reconstruction between the optimization-based approach for image inversion using multiple latent spaces and conventional optimization-based approaches. Table 2 below presents results of a comparison of reconstruction between the encoder-based approach for image inversion using multiple latent spaces and conventional encoder-based approaches. Both of the comparisons are evaluated on the LSUN Cars, LSUN Horses, and LSUN Cats databases.

TABLE 1

Optimization-Based Reconstruction Comparison

| | Cars | | Horses | | Cats | |
|---|---|---|---|---|---|---|
| Method | LPIPS | PSNR | LPIPS | PSNR | LPIPS | PSNR |
| Conventional System 1 | 0.34 | 14.44 | 0.45 | 13.46 | 0.44 | 18.32 |
| Conventional System 2 | 0.24 | 17.29 | 0.34 | 15.74 | 0.35 | 22.10 |
| Conventional System 3 | 0.45 | 15.92 | 0.42 | 17.20 | 0.49 | 25.10 |
| Conventional System 4 | 0.36 | 17.00 | 0.42 | 16.70 | 0.42 | 25.10 |
| Conventional System 5 | 0.38 | 19.39 | 0.44 | 18.73 | 0.41 | 22.36 |
| Described Systems | 0.16 | 22.81 | 0.23 | 21.70 | 0.22 | 26.90 |

As shown in Table 1 above, the optimization-based approach for image inversion using multiple latent spaces outperforms conventional optimization-based approaches for reconstruction on each of the three datasets evaluated.

TABLE 2

Encoder-Based Reconstruction Comparison

| | Cars | | Horses | | Cats | |
|---|---|---|---|---|---|---|
| Method | LPIPS (vgg/alex) | PSNR | LPIPS (vgg/alex) | PSNR | LPIPS (vgg/alex) | PSNR |
| Conventional System 1 | 0.47/0.38 | 14.57 | 0.55/0.44 | 13.98 | 0.56/0.46 | 14.68 |
| Conventional System 2 | 0.43/0.30 | 16.44 | 0.45/0.29 | 16.53 | 0.48/0.33 | 17.58 |
| Conventional System 3 | 0.45/0.35 | 15.61 | 0.52/0.39 | 14.50 | 0.53/0.42 | 15.64 |
| Described Systems | 0.28/0.19 | 19.21 | 0.34/0.21 | 18.61 | 0.37/0.27 | 18.59 |

As shown in Table 2 above, the encoder-based approach for image inversion using multiple latent spaces outperforms conventional encoder-based approaches for reconstruction on each of the three datasets evaluated.

Example System and Device

Figure 8:
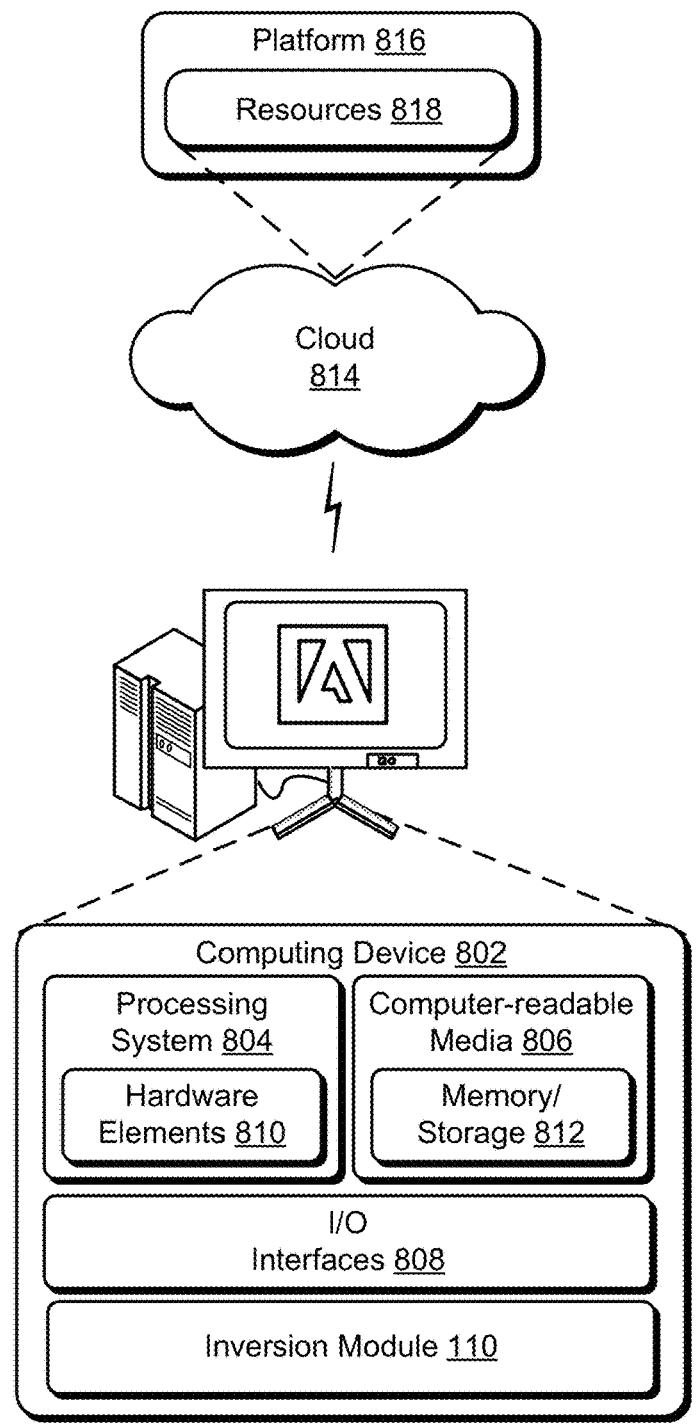
FIG. 8 illustrates an example system that includes an example computing device that is representative of one or more computing systems and/or devices for implementing the various techniques described herein.

FIG. 8 illustrates an example system 800 that includes an example computing device that is representative of one or more computing systems and/or devices that are usable to implement the various techniques described herein. This is illustrated through inclusion of the inversion module 110. The computing device 802 includes, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that are configured as processors, functional blocks, and so forth. This includes example implementations in hardware as an application specific integrated circuit or other logic device formed using one or more semiconductors. The hardware elements 810 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 806 is illustrated as including memory/storage 812. The memory/storage 812 represents memory/storage capacity associated with one or more computer-readable media. In one example, the memory/storage 812 includes volatile media (such as random access memory (RAM)) and/or nonvolatile media (such as read only memory (ROM), Flash memory, optical disks, magnetic disks, and so forth). In another example, the memory/storage 812 includes fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 802. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 810. For example, the computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing system 804. The instructions and/or functions are executable/operable by one or more articles of manufacture (for example, one or more computing devices 802 and/or processing systems 804) to implement techniques, modules, and examples described herein.

The techniques described herein are supportable by various configurations of the computing device 802 and are not limited to the specific examples of the techniques described herein. This functionality is also implementable entirely or partially through use of a distributed system, such as over a "cloud" 814 as described below.

The cloud 814 includes and/or is representative of a platform 816 for resources 818. The platform 816 abstracts underlying functionality of hardware (e.g., servers) and software resources of the cloud 814. For example, the resources 818 include applications and/or data that are utilized while computer processing is executed on servers that are remote from the computing device 802. In some examples, the resources 818 also include services provided over the Internet and/or through a subscriber network, such as a cellular or Wi-Fi network.

The platform 816 abstracts the resources 818 and functions to connect the computing device 802 with other computing devices. In some examples, the platform 816 also serves to abstract scaling of resources to provide a corresponding level of scale to encountered demand for the resources that are implemented via the platform. Accordingly, in an interconnected device embodiment, implementation of functionality described herein is distributable throughout the system 800. For example, the functionality is implementable in part on the computing device 802 as well as via the platform 816 that abstracts the functionality of the cloud 814.

CONCLUSION

Although implementations of systems for image inversion using multiple latent spaces have been described in language specific to structural features and/or methods, it is to be understood that the appended claims are not necessarily limited to the specific features or methods described. Rather, the specific features and methods are disclosed as example implementations of systems for image inversion using multiple latent spaces, and other equivalent features and methods are intended to be within the scope of the appended claims. Further, various different examples are described and it is to be appreciated that each described example is implementable independently or in connection with one or more other described examples.

What is claimed is:

1. A method comprising:
generating, by a computing device, a segment map that segments an input digital image into a first image region and a second image region and assigns the first image region to a first latent space and the second image region to a second latent space that corresponds to a layer of a convolutional neural network;
computing, by the computing device, an inverted latent representation of the input digital image using a binary mask for the second image region;
modifying, by the computing device, the inverted latent representation of the input digital image using an edit direction vector that corresponds to a visual feature; and
generating, by the convolutional neural network, an output digital image that depicts a reconstruction of the input digital image having the visual feature based on the modified inverted latent representation of the input digital image.

2. The method as described in claim 1, wherein the segment map segments the input digital image into the first image region and the second image region based at least partially on a learned perceptual image patch similarity spatial error map.

3. The method as described in claim 1, wherein the visual feature is a color of an object depicted in the output digital image and the object is depicted in the input digital image as having a different color.

4. The method as described in claim 1, wherein the visual feature is a pose of an object depicted in the output digital image and the object is depicted in the input digital image as having a different pose.

5. The method as described in claim 1, wherein the visual feature is a size of an object depicted in the output digital image and the object is depicted in the input digital image as having a different size.

6. The method as described in claim 1, further comprising generating a predicted invertibility map for the input digital image by processing the input digital image using a machine learning model trained on training data to receive an image as an input and generate a predicted invertibility map for the received image as an output.

7. The method as described in claim 6, further comprising refining the predicted invertibility map for the input digital image using a pretrained semantic segmentation network.

8. The method as described in claim 1, wherein the convolutional neural network is pretrained and included in a generator network of a generative adversarial network.

9. The method as described in claim 1, wherein the layer of the convolutional neural network is an intermediate layer and a predicted change in feature values of the intermediate layer for the second image region is used to compute the inverted latent representation of the input digital image.

10. The method as described in claim 9, further comprising modulating the predicted change in feature values of the intermediate layer and the binary mask for the second image region.

11. A system comprising:
a segment module implemented by one or more processing devices and one or more computer-readable storage media to:
receive input data describing an input digital image; and generate a segment map that segments the input digital image into a first image region and a second image region and assigns the first image region to a first latent space and the second image region to a second latent space that corresponds to a layer of a convolutional neural network;

a generator module implemented by the one or more processing devices and the one or more computer-readable storage media to compute an inverted latent representation of the input digital image using a binary mask for the second image region;

an editing module implemented by the one or more processing devices and the one or more computer-readable storage media to modify the inverted latent representation of the input digital image using an edit direction vector that corresponds to a visual feature; and a display module implemented by the one or more processing devices and the one or more computer-readable storage media to generate an output digital image using the convolutional neural network that depicts a reconstruction of the input digital image having the visual feature based on the modified inverted latent representation of the input digital image.

12. The system as described in claim 11, wherein the segment module is further implemented to generate a predicted invertibility map for the input digital image by processing the input digital image using a machine learning model trained on training data to receive an image as an input and generate a predicted invertibility map for the received image as an output.

13. The system as described in claim 12, wherein the segment map is generated by refining the predicted invertibility map for the input digital image using a pretrained semantic segmentation network.

14. The system as described in claim 11, wherein the layer of the convolutional neural network is an intermediate layer and a predicted change in feature values of the intermediate layer for the second image region is used to compute the inverted latent representation of the input digital image.

15. A non-transitory computer-readable storage medium storing executable instructions, which when executed by a processing device, cause the processing device to perform operations comprising:

predicting an invertibility map for an input digital image based at least partially on a learned perceptual image patch similarity spatial error map;

generating a segment map by refining the predicted invertibility map using a pretrained semantic segmentation network, the segment map segments the input digital image into a first image region and a second image region and assigns the first image region to a first latent space and the second image region to a second latent space that corresponds to a layer of a convolutional neural network;

computing an inverted latent representation of the input digital image using a binary mask for the second image region;

modifying the inverted latent representation of the input digital image using an edit direction vector that corresponds to a visual feature; and generating an output digital image using the convolutional neural network that depicts a reconstruction of the input digital image having the visual feature based on the modified inverted latent representation of the input digital image.

16. The non-transitory computer-readable storage medium as described in claim 15, wherein the visual feature is a size of an object depicted in the output digital image and the object is depicted in the input digital image as having a different size.

17. The non-transitory computer-readable storage medium as described in claim 15, wherein the visual feature is a color of an object depicted in the output digital image and the object is depicted in the input digital image as having a different color.

18. The non-transitory computer-readable storage medium as described in claim 15, wherein the visual feature is a pose of an object depicted in the output digital image and the object is depicted in the input digital image as having a different pose.

19. The non-transitory computer-readable storage medium as described in claim 15, wherein the layer of the convolutional neural network is an intermediate layer and a predicted change in feature values of the intermediate layer for the second image region is used to compute the inverted latent representation of the input digital image.

20. The non-transitory computer-readable storage medium as described in claim 19, wherein the operations further comprise modulating the predicted change in feature values of the intermediate layer and the binary mask for the second image region.

* * * * *